United States Patent [19]
Butler, III et al.

[11] Patent Number: 5,497,416
[45] Date of Patent: Mar. 5, 1996

[54] TELEPHONE INTERFACE SECURITY LOCK

[75] Inventors: Walter K. Butler, III, Standish; John J. Napiorkowski, Cape Elizabeth; Thomas W. Kroll, South Portland; Mark P. Cote, Springvale, all of Me.

[73] Assignee: Siecor Corporation, Hickory, N.C.

[21] Appl. No.: 47,566

[22] Filed: Apr. 16, 1993

Related U.S. Application Data

[63] Continuation-in-part of Ser. No. 956,144, Oct. 5, 1992, Pat. No. 5,333,193, Ser. No. 956,516, Oct. 5, 1992, Ser. No. 956,531, Oct. 5, 1992, Pat. No. 5,416,837, Ser. No. 956,746, Oct. 5, 1992, and Ser. No. 29,592, Mar. 11, 1993, which is a continuation-in-part of Ser. No. 956,144, Ser. No. 956,516, Ser. No. 956,531, and Ser. No. 956,746, said Ser. No. 956,144, Ser. No. 956,516, Ser. No. 956,531, and Ser. No. 956,746, each is a continuation-in-part of Ser. No. 523,457, May 15, 1990, Pat. No. 5,153,910.

[51] Int. Cl.$^6$ ............................................. H04M 9/00
[52] U.S. Cl. ..................... 379/399; 379/412; 379/445; 379/397; 439/304; 439/133
[58] Field of Search .................... 379/399, 412, 379/445, 397, 442, 327, 428, 429; 439/304, 133

[56] References Cited

U.S. PATENT DOCUMENTS

| | | | |
|---|---|---|---|
| D. 315,140 | 3/1991 | Dowler | D13/133 |
| 4,800,588 | 1/1989 | Poster | 379/412 |
| 4,825,466 | 4/1989 | Dowler et al. | 379/445 |
| 4,910,770 | 3/1990 | Collins et al. | 379/399 |
| 4,945,559 | 7/1990 | Collins et al. | 379/399 |
| 4,979,209 | 12/1990 | Collins et al. | 379/399 |
| 5,297,199 | 3/1994 | Graham et al. | 379/399 |
| 5,312,266 | 5/1994 | Daoud | 379/399 |

OTHER PUBLICATIONS

GTE brochure, Protected Terminating Device NI–2006, GTE Control Devices, Standish, ME, May 1992.
GTE brochure, Protected Terminating Device PTD, GTE Control Devices, Standish, ME, May 1992.
GTE brochure, Protected Terminating Devices NI–2025, NI–2050, NI–2100, NI–2200, GTE Control Devices, Standish, ME, May 1992.
GTE brochure, Introducing the Next Step In the Evolution of Network Interface Technology, GTE Control Devices, Standish, ME, May 1992.

Primary Examiner—Jeffery A. Hofsass
Assistant Examiner—Scott Wolinsky
Attorney, Agent, or Firm—Wesley T. Noah

[57] ABSTRACT

A network termination module for telephone network interface apparatus is provided with a selectively operable latching device for a lock securing the security cover over the subscriber terminals. With the latching device in a position to engage the security cover lock, the cover can be opened only by keying open the lock and removing it. On the other hand, an authorized person can, upon opening the telco cover of the apparatus, expose the latching device whereby it can be displaced to enable opening of the security cover without unlocking or removing the lock.

38 Claims, 8 Drawing Sheets

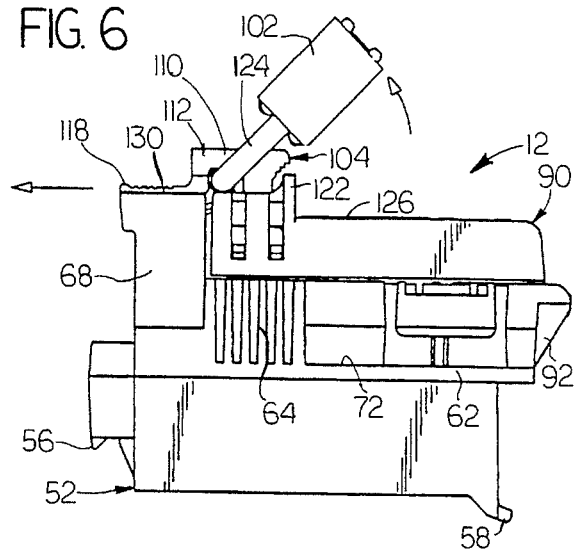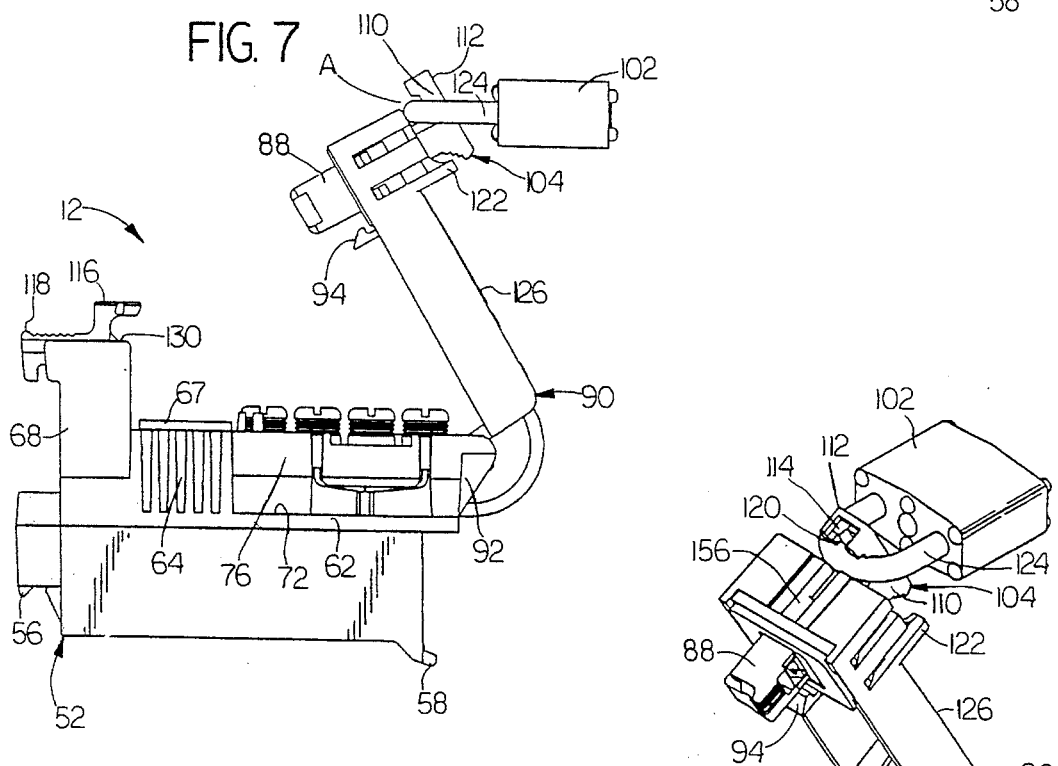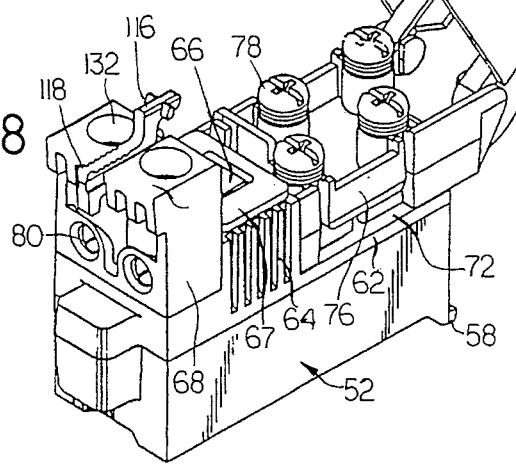

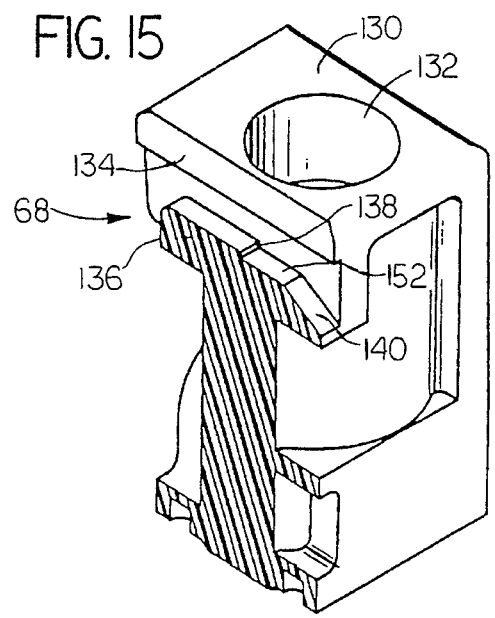
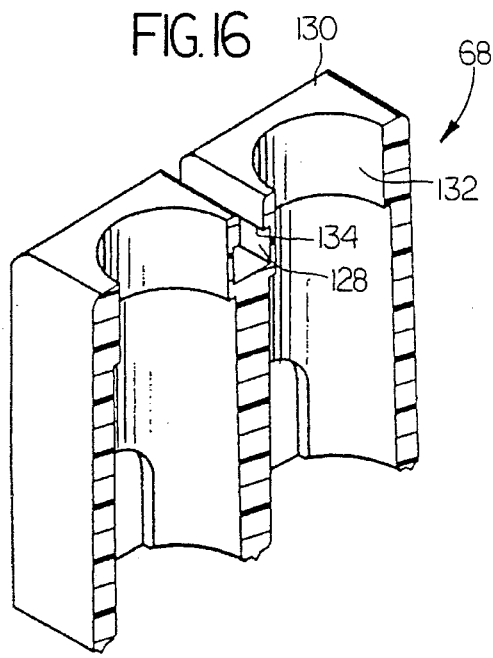
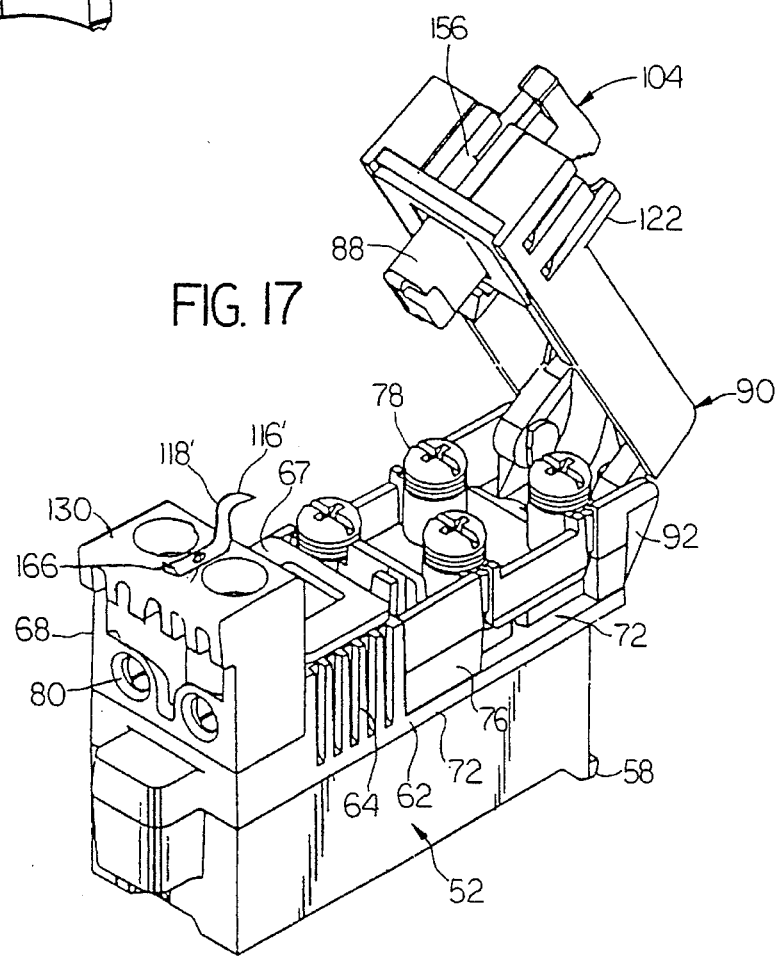

TELEPHONE INTERFACE SECURITY LOCK

This patent application is a continuation-in-part of U.S. patent application Ser. Nos. 07/956,144, filed Oct. 5, 1992(now U.S. Pat. No. 5,333,193) 07/956,516, 07/956,531, filed Oct. 5, 1992 (now U.S. Pat. No. 5,416,837) and 07/956,746, all filed on Oct. 5, 1992 as continuation-in-part applications from U.S. patent application serial No. 07/523,457, filed May 15, 1990 (now U.S. Pat. No. 5,153,910). It is also a continuation-in-part of U.S. patent application Ser. No. 08/029,592, filed Mar. 11, 1993 as a continuation-in-part of the aforementioned continuation-in-part applications.

BACKGROUND OF THE INVENTION

The present invention relates to network termination modules that are utilized in telephone network interface apparatus to isolate the telephone company ("telco" herein) portion of the system from that serving the respective subscribers. Such isolation is desirable in order to segregate the responsibility for faults or malfunctions that may occur in the respective parts of the system.

The aforementioned patent applications (the contents of which patent applications are incorporated herein by reference), of which this application is a continuation-in-part, describe a telephone network interface apparatus arrangement utilizing a device, referred to herein as a "network termination module," in which the demarcation between the telco and subscriber portions of the system is established. Such network termination modules are advantageously organized to house within a single base structure those elements, such as a jack, a protector assembly and other apparatus required to interface the wiring for the subscriber telephone service with the incoming telephone wiring. While such devices can be used as single, stand-alone units, they are particularly useful for applications, such as office buildings, apartments, or the like, in which the incoming telephone wiring is intended for use by a multitude of subscribers. The described modules are particularly suited to be stacked in close, side-by-side relation in box-like enclosures, termed the "network interface apparatus", that, depending upon their size, are capable of accommodating any number of modules. Consequently, there results from such devices the ability, not only to segregate that portion of the system which is the responsibility of the subscriber from that for which the telephone company is responsible, but also to permit the centralization of a large number of the devices for ready access, whether by the subscriber or by a telco installer.

It is known to provide security for equipment of the described type by incorporating an enclosure that possesses two covers, one of which can be opened by both telco installers and by subscribers and the other which can be opened solely by the former. In this way, subscriber wiring is accessible by both the subscriber and a telco installer but telco wiring and that portion of the system which is appurtenant thereto can be accessed only by the telco installer.

With the housing within a common enclosure of equipment that provides telephone service to a large number of diverse subscribers, the need for security extends, not only to the interior of the housing, but even to the interior of each module. Thus, it is known to provide individual module with individual security covers and to provide means for locking such covers in place, typically by a padlock that can be opened only by the concerned subscriber. Early efforts in the design of this equipment utilized telco covers which, when opened, permitted removal of the padlock securing the module cover whereupon a telco installer could have access to the module interior. Such efforts are described in U.S. Pat. No. 4,979,209 granted Dec. 18, 1990 to T. J. Collins et al. and assigned to Keptel, Inc.

Through use it has been discovered that apparatus requiting removal of the padlock before access to subscriber wiring in subscriber line or network termination modules of the described type can be obtained by a telephone installer suffers several disadvantages. For example, when a padlock must be removed from the module of a subscriber to permit access to the interior thereof, there is the problem that the lock can be misplaced or lost, thereby denying the subscriber the requisite security until the lock is replaced. Even more troublesome, however, is the fact that, when access is required to such modules, it is readily conceivable that the locks for a pair or more of the modules can be switched or mixed. This, of course, creates the disadvantage that, not only must the lock of the concerned subscriber be replaced, but the lock erroneously put in place must be removed, either by breaking it or by the engagement of a locksmith.

In this regard, there is disclosed in U.S. Pat. No. 4,825,466, granted Apr. 25, 1989, to Dowler et al. and assigned to the assignee herein, an arrangement for enabling authorized access to a telephone interface security device without need to remove the lock. Such arrangement presents a complex organization of parts occupying considerable space thereby making it inappropriate for use with network termination modules of the type described herein.

It is to the amelioration of these and other problems associated with the use of the concerned equipment that the present invention is directed.

SUMMARY OF THE INVENTION

Accordingly, the present invention provides an improved network termination module for attachment to a telephone network interface apparatus comprising a base structure; means in said base structure for connecting telco wiring thereto; means in said base structure for connecting subscriber wiring thereto; a movable cover adapted to enclose said subscriber wiring connecting means; a padlock for securing the security cover to said base structure; means for attaching said padlock to said cover; a locking member mounted on said base structure for movement between a first position and a second position, and a locking finger on said locking member operative, when said locking member is in said first position, to obstruct said locking member and said padlock and, when said locking member is in said second position, to free said locking member from said padlock.

The locking member is slidably mounted in a guideway formed in the base structure and carries a locking finger that, in its extended position, is adapted to be received in cooperating structure formed in the cover whereupon it lockingly engages the bail of the padlock attached to the cover and cooperates with the padlock to prevent the cover from being opened without the unlocking and removal of the padlock. On the other hand, when the locking member is moved to its retracted position and the locking finger is disengaged from the padlock bail, the cover can be opened while the padlock remains locked and attached to the cover.

As utilized in the telephone network interface apparatus, the locking member is, in its extended position, covered by the telco cover and thereby inaccessible when the telco cover is closed. Consequently, with the apparatus in this condition, the security cover on the network termination module can be opened only when the padlock carded by the module is unlocked by the subscriber and the padlock removed from its position on the module. Alternatively, due to the described organization, the module security cover can be readily opened by an authorized person, such as a telco installer having the capability of opening the telco cover on the network interface enclosure. By opening the telco cover, the locking members on the respective modules are exposed and thus can be selectively moved to their retracted positions displacing the respective locking fingers out of engagement with the associated padlock bail. With the locking finger disengaged from the padlock, the module security cover is free to be moved to its open position even while the padlock remains locked and in its attached position on the security cover.

It is accordingly a principle object of the present invention to provide an improved network termination module for attachment to a telephone network interface apparatus employing security means to prevent unauthorized access to subscriber wiring but which means can be overridden when authorized servicing of the unit is required.

It is another object of the invention to provide an improved network termination module of the described type in which the overriding of the security means can be effected without need for removal of the padlock from its locked condition on the equipment whereby the danger of losing or inadvertent switching of padlocks is avoided.

For a better understanding of the invention, its operating advantages and the specific objectives obtained by its use, reference should be made to the accompanying drawings and description which relate to a preferred embodiment thereof.

BRIEF DESCRIPTION OF THE DRAWINGS

FIG. 6 is a side elevational view of the network termination module of the invention shown with the security cover closed;

FIG. 7 is a view similar to FIG. 6 with the network termination module shown with the security cover open;

FIG. 8 is a perspective view of the network termination module in the condition of FIG. 7;

FIG. 15 is a partial perspective view of the shroud taken along line 15—15 of FIG. 14;

FIG. 16 is a partial perspective view of the shroud taken along line 16—16 of FIG. 14;

FIG. 17 is a perspective view, similar to FIG. 8, illustrating an alternative embodiment of the invention.

DETAILED DESCRIPTION OF THE PREFERRED EMBODIMENTS

Figure 1:
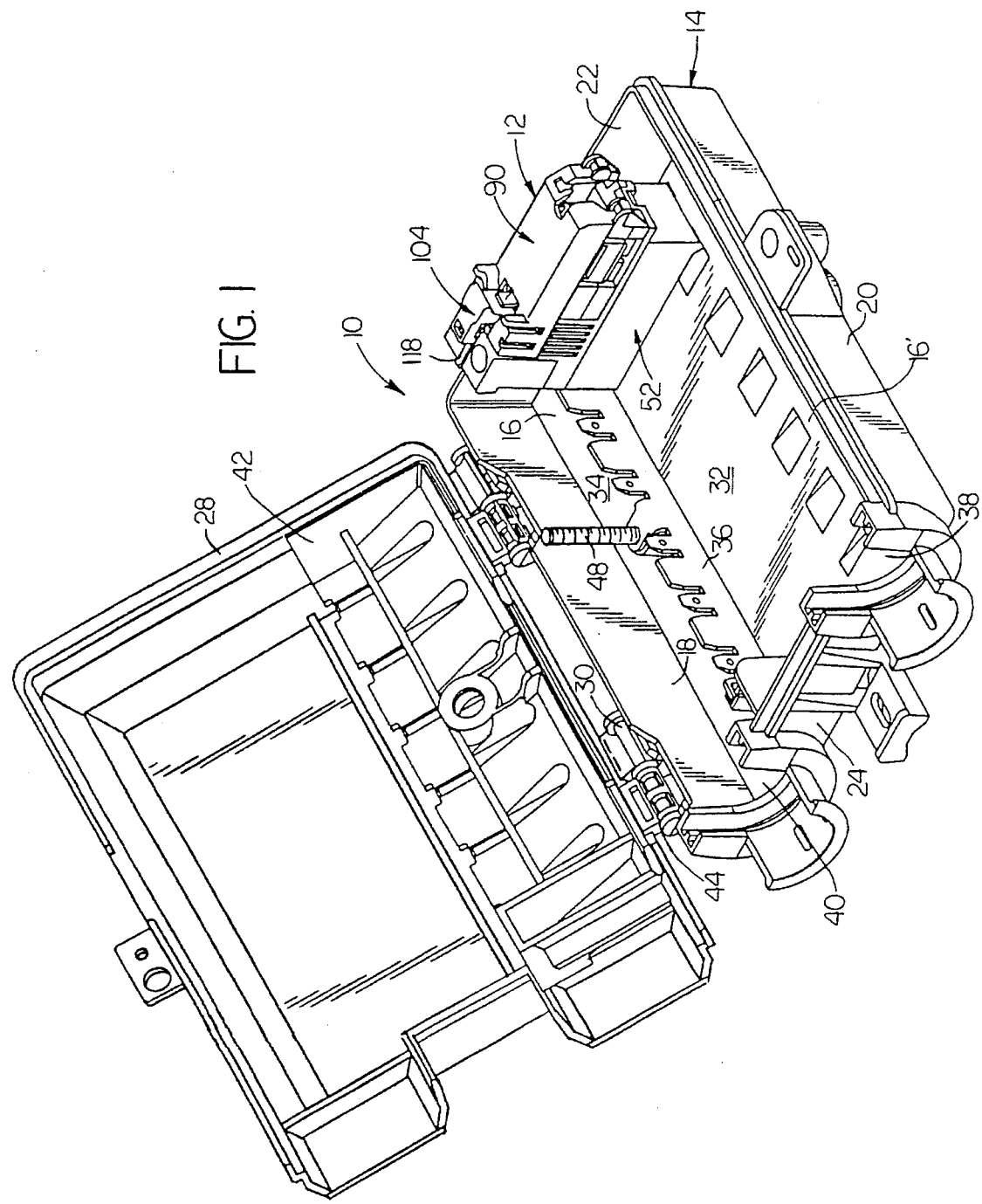
FIG. 1 is a perspective view of a telephone network interface apparatus employing a network termination module according to the present invention illustrating the enclosure covers in an open condition.

Referring now to the drawings, there is shown a telephone network interface apparatus 10 employing a network termination module 12 according to the present invention. Apparatus 10, while illustrated in a reclined position, would typically be installed in a vertical attitude upon a wall. It comprises an enclosure housing 14 having a back wall 16 from which a pair of opposed side walls 18 and 20 and top and bottom walls 22 and 24, respectively, extend to form a frontal opening 26. A closure cover 28 which may be freely opened is hinged at 30 to close the frontal opening 26.

The interior of the enclosure housing 14 contains a raised panel 16' spaced from the back wall 16 and is divided generally into a subscriber portion 32 and a telco portion 34. Positioned between subscriber portion 32 and telco portion 34 is a ground bus 36 that extends in spaced, parallel relation to the side wall 18. A pair of through-openings 38 and 40 formed in the bottom wall 22 permit wiring access to subscriber portion 32 and telco portion 34, respectively. Security for the telco wiring portion 34 of the housing 14 is provided by a cover, termed "the telco cover" 42, that is mounted for pivotal movement on a enclosure side wall 18 by a pair of longitudinally spaced, aligned hinges 44 disposed adjacent the hinges 30. The telco cover 42 is locked by means of a free-turning threaded cap 46 that is captured in the cover and that engages a threaded post 48 which, as shown, may form part of the ground connection for bus 36. The telco cover 42 provides an effective closure over the telco wiring portion of the apparatus while exposing for subscriber access those elements of equipment which relate to subscriber service. In order to render the telco cover 42 secure, the cap 46 is configured to be rotated only by a tool of special design for use by a telco installer.

Figure 2:
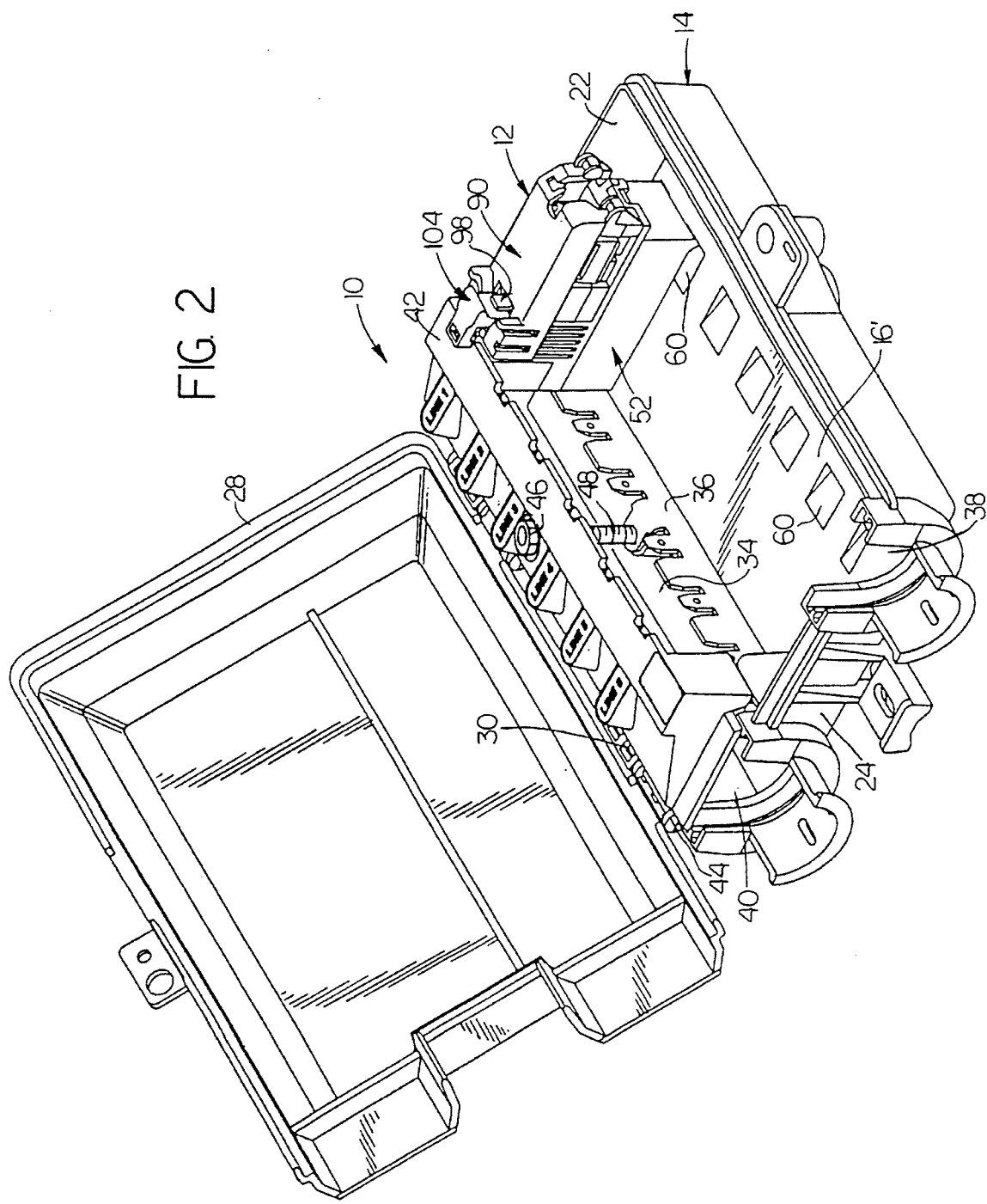
FIG. 2 is a view similar to FIG. 1 but illustrating the telco cover on the enclosure in a closed condition.
Figure 3:
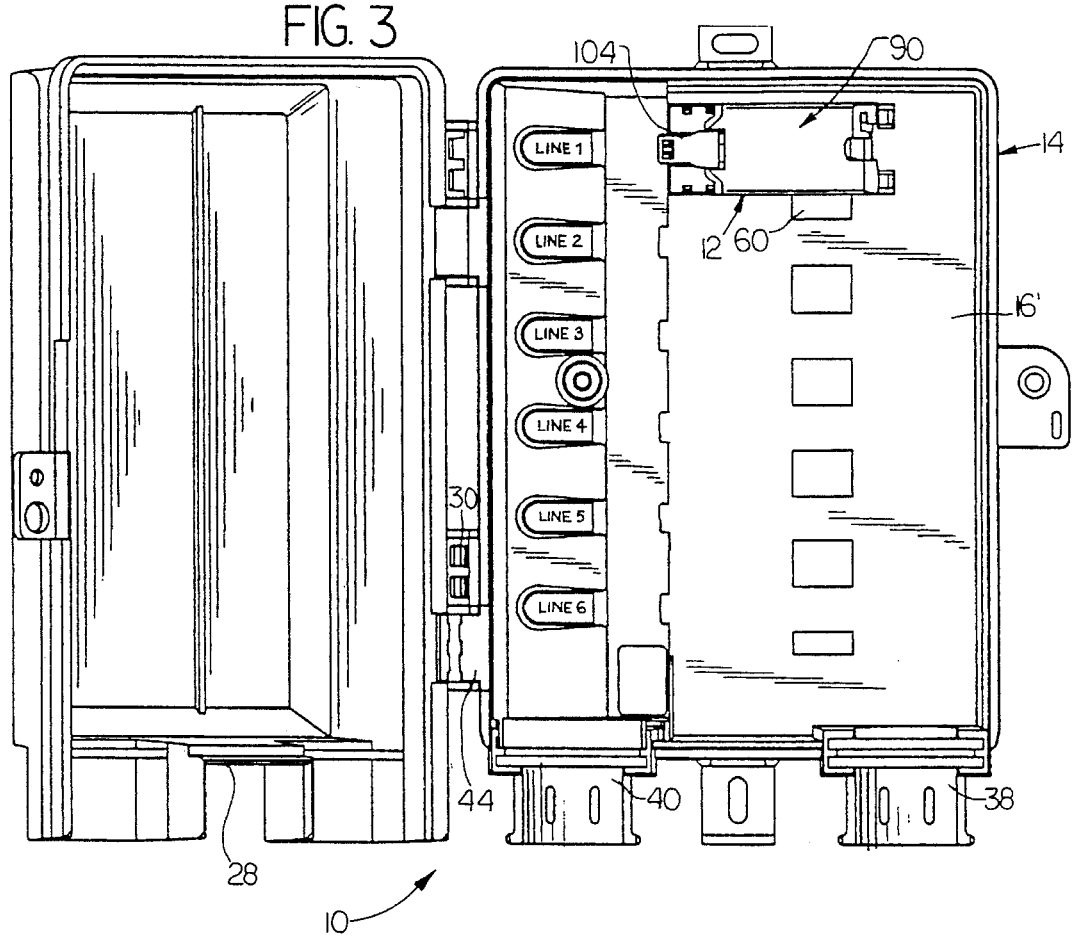
FIG. 3 is a plan view of the organization shown in the condition of FIG. 2.
Figure 4:
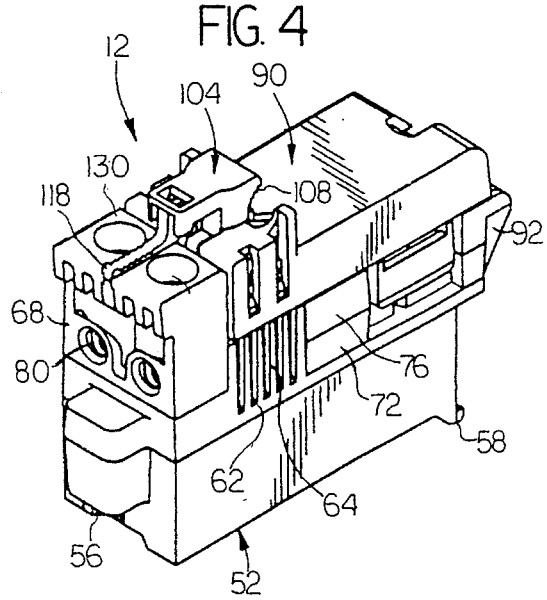
FIG. 4 is a perspective view of a network termination module illustrating the locking member in its secure position but with the padlock removed for clarity.
Figure 5:
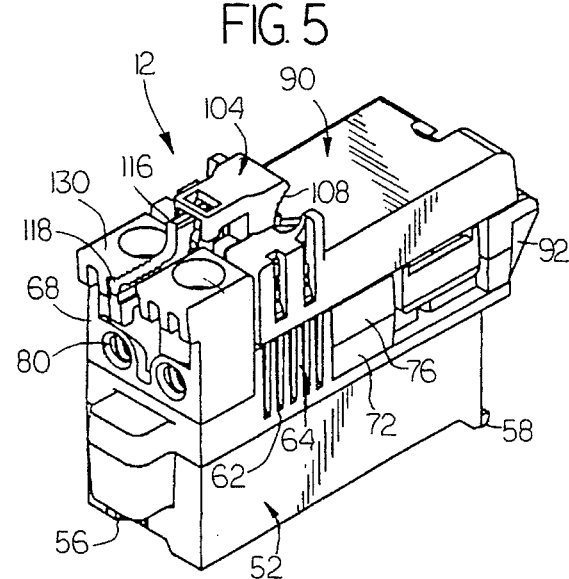
FIG. 5 is a view similar to FIG. 4 illustrating the locking member in its release position.
Figure 9:
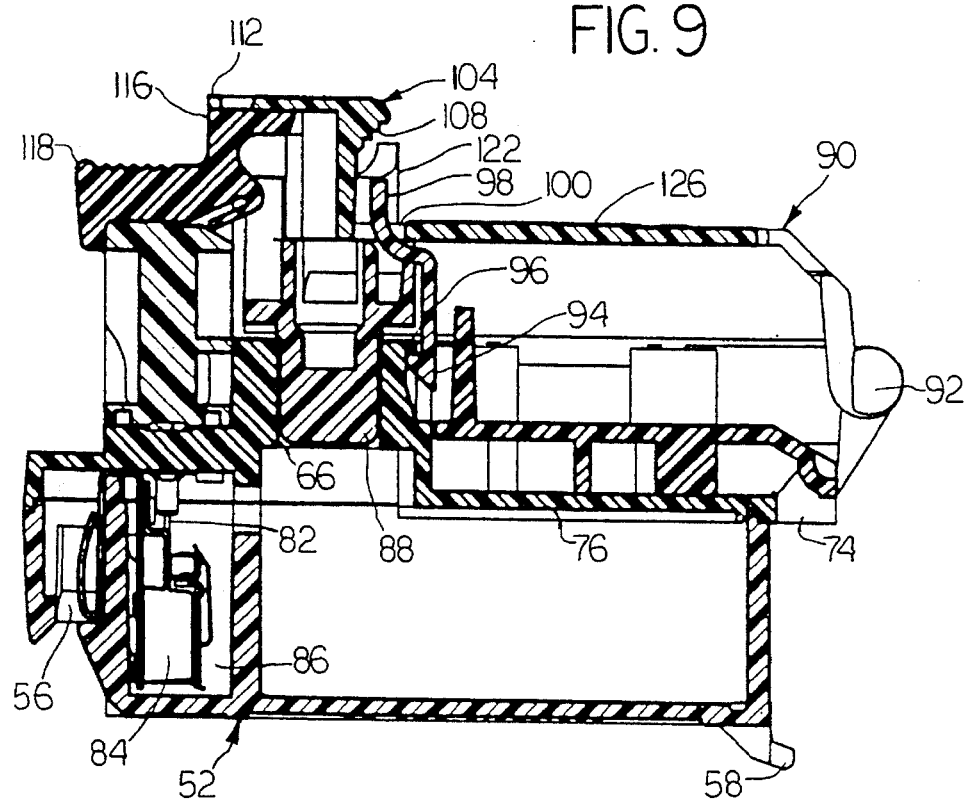
FIG. 9 is a vertical sectional view of the network termination module of the invention.

A plurality of network termination modules 12, only one of which is shown in FIGS. 1 and 2, is arranged in stacked side-by-side relation within the interior of the housing 14. Each module 12, whose elements can advantageously be moldably formed from thermo-plastic material, contains electrical circuitry, which is not particularly germane to this invention but is pertinent to the telephone service for a single subscriber. For a description of the involved circuitry, reference should be made to the several U.S. patent applications first written above herein, of which this application is a continuation-in-part and all of whose contents are incorporated in this application by reference. Each module 12 comprises a base structure 52 defined by rectangularly disposed sides forming a closed container 55 housing relevant telephone electronic circuitry (not shown). At one end, the base structure 52 is provided with a grounding clip 56, and at the other end with a pair of depending locking feet 58 that engage undercut grooves 60 in the housing panel 16' for fixedly securing, in cooperation with the grounding connection between the clip 56 and bus 36, the module 12 to the housing 14. The upper side of the base structure 52 is formed by intermediate support 62 having a body portion 64 that houses a telephone jack 66 and a shroud 68 which contains a pair of line terminals 70 that serve to connect incoming telco wiring. A gasket 67 formed of flexible, elastomeric material surrounds the opening defining the jack 66. The remainder of the support 62 is defined by a platform 72 having a receptor arch 74 at one end for mounting a terminal strip 76 which contains a plurality of subscriber terminals 78.

Shroud 68 is desirably fixed to the base structure 52 by means of pressure welding, or the like. Telco wiring can be connected to line terminals 70 through wire entry ports 80. Depending contact pins 82 extend from the line terminals 70 to electrically connect them to a protective element 84 which is housed within a forward compartment 86 of the base structure 52.

The subscriber terminals 78 form part of the terminal strip 76 and are electrically connected to a telephone plug 88. As described in U.S. patent application Ser. No. 08/029,592, the terminal strip 76 is adapted to be removably connected to the platform 72 of the intermediate support 62. Security for the subscriber terminals 78 is provided by a security cover 90 that, for example, is hinged at 92 at one end of the terminal strip and that, at the other end, possesses a snap latch 94 for securing it, in cooperation with a lip 96, to the module base structure 52. An actuator 98 for the snap latch 94 extends through an opening 100 in the cover 90 for manipulation to release the latch 94 when it is desired to open the module security cover 90.

The security cover 90 is of a size to overlie the upper surface of the terminal strip 76 to cover, when closed, the subscriber terminals 78 and the snap latch 94. As shown, the free end of the cover 90 extends beyond the end of the body portion 64 and mounts a telephone plug 88 which is adapted to be received in the telephone jack 66 when the cover is pivoted to its closed position.

In accordance with this invention means are provided for locking the security cover 90 to the base structure 52 via a padlock 102, the key for which is maintained by the subscriber whose service is effected by the concerned module 12, but which means provides for an overriding of the padlock. In overriding the padlock the security cover 90 can thus be opened by an authorized telephone installer without need for unlocking of the padlock nor for its removal from its locked position on the cover.

Figure 13:
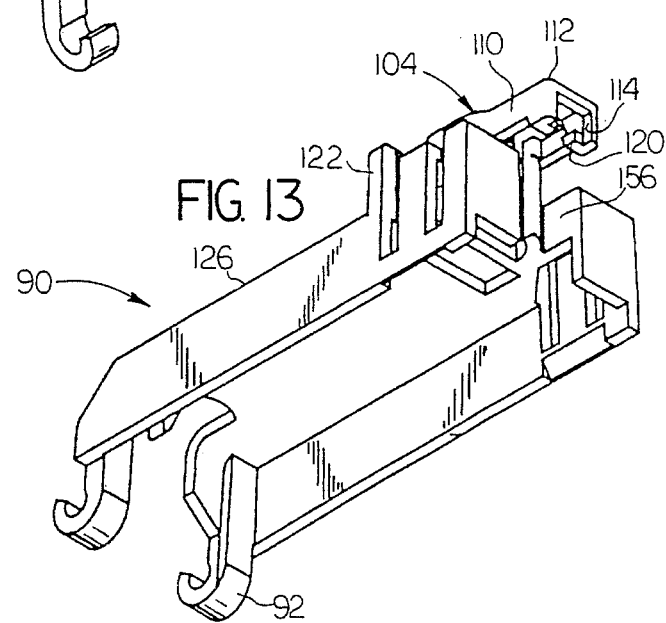
FIG. 13 is a bottom perspective view of the security cover of FIG. 12.
Figure 14:
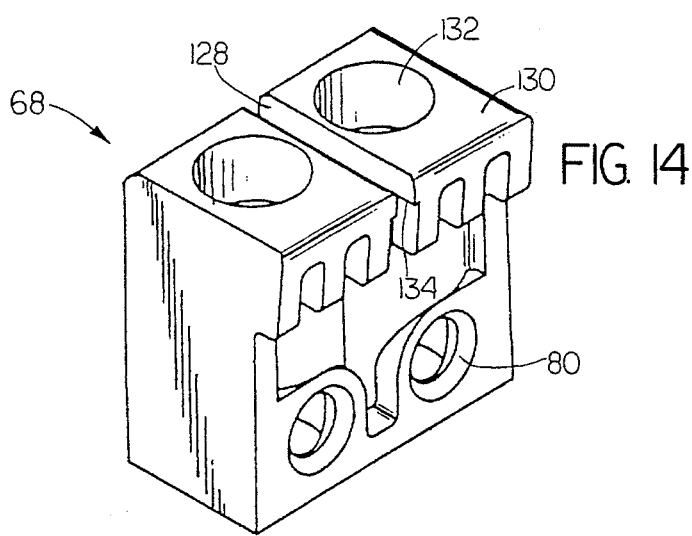
FIG. 14 is a perspective view of a shroud portion of the network termination module of the invention.

Accordingly, the security cover 90, at its free end, is provided in the region that overlies the telephone plug 88 with a padlock retainer member 104 that extends opposite from the plug 88 and is integrally formed on or otherwise joined to the cover. The padlock retainer member 104 includes an elongated base portion 106 having on its back side a serrated lift surface 108 to facilitate raising the cover 90. The front side of the base portion contains a lock retainer arm 110 which, as shown best in FIG. 13, is formed with a substantially hollow endpiece 112 containing a rectangular opening 114 for reception of the locking finger 116 of locking member 118, as hereinafter more fully explained. Cooperating with the endpiece 112 are a pair of oppositely spaced, inturned flange members 120 that provide a support function which is also hereinafter more fully described.

Also formed in this region of the security cover 90 is a pair of bail guide posts 122, that are each spaced outwardly from opposite sides of the retainer base portion 106 to define a space which, together with the region positioned below the lock retainer arm 110, is particularly formed for receiving the bail 124 of the padlock 102. From examination of FIGS. 6 and 7 it will be appreciated that the perpendicular surface relationship which exists between the posts 122 and the outwardly facing surface 126 of the security cover 90 provides a receptacle that, in cooperation with the body of the padlock, holds the padlock in place on the security cover.

In contrast with other comparable telephone security devices, such as that shown in U.S. Pat. No. 4,979,209, in which the locking function for holding the security cover closed is accomplished by the padlock bail being arranged to prevent relative movement between fixed elements on the module base structure and the movable cover operation of the present invention is achieved by an arrangement in which the padlock bail 124 secures the cover 90 to a locking member 118 that is movable between extended and retracted positions, and in only the former of which is the locking function of the padlock able to occur. Thus, as shown in the respective drawing figures there is provided a locking member 118 that is mounted for sliding movement in a slot 128 formed in the shroud 68 on the base structure 52. As shown, the slot 128 extends longitudinally across the mid portion of the upper surface 130 of the shroud 68 intermediate a pair of openings 132 provided therein for reception of the telco line terminals 70. The slot 128 is essentially in the shape of an inverted "T" defined by shouldered ribs 134 to prevent outward movement of the locking member 118. The bottom surface of the slot 128, however, contains an irregular shape which includes oppositely facing shoulder surfaces 136 and 138, respectively, and an inclined surface 140, all of which cooperate to regulate the movement of the locking member 118 with respect to the slot.

Figure 11:
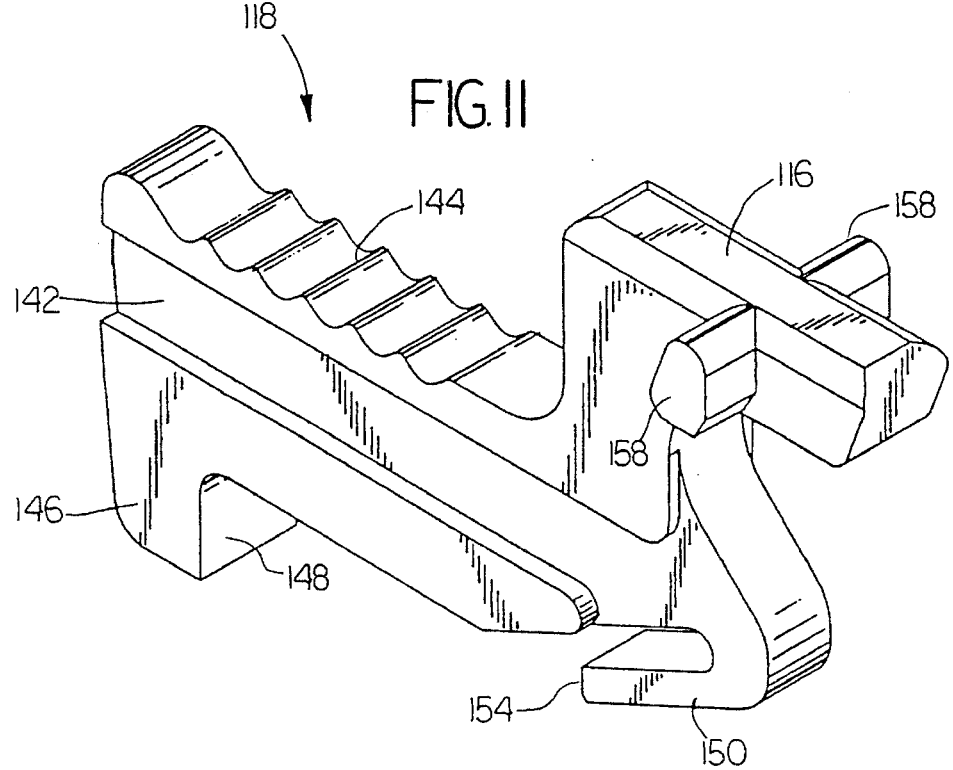
FIG. 11 is a perspective view of the locking member of the invention detached from the network termination module.

The locking member 118, as best depicted in FIG. 11, comprises an elongated body containing a longitudinal groove 142 on each side for reception in the slot 128 in cooperation with the ribs 134. The relationship between the ribs 134 and the grooves 142 is such that serrations 144 formed along the upper edge of the body are positioned sufficiently beyond the adjacent upper shroud surface 130 to facilitate grasping of the locking member by one's thumb to effect its movement along the slot 128.

The back end of the locking member 118 contains a downwardly extending projection 146 defining a forwardly facing shoulder 148 which cooperates with shoulder surface 136 on the shroud 68 for limiting the extended movement of the locking member with respect to the shroud. Conversely, the forward end of the locking member 118 is formed with a downwardly extending finger 150 which, due to its inclined and spaced disposition with respect to the adjacent portion of the body, renders it flexible. Consequently, cooperation between the flexible finger 150 and the portion 152 of the slot bottom surface intermediate the shoulder 138 and the inclined surface 140 imposes an upward bias on the locking member 118 so that it is snugly received in the slot 128. The backwardly facing end surface 154 of the finger 150 is adapted to engage the shoulder 138 on the bottom surface of the slot 128 to define the limit of retracted movement of the locking member 118 within the slot. When the locking member 118 is in its fully extended, or locking position, the flexible finger 150 engages the inclined surface 140 on the slot surface whereupon the flexure in the finger is relaxed and stressing of the member reduced thereby.

Figure 10A:
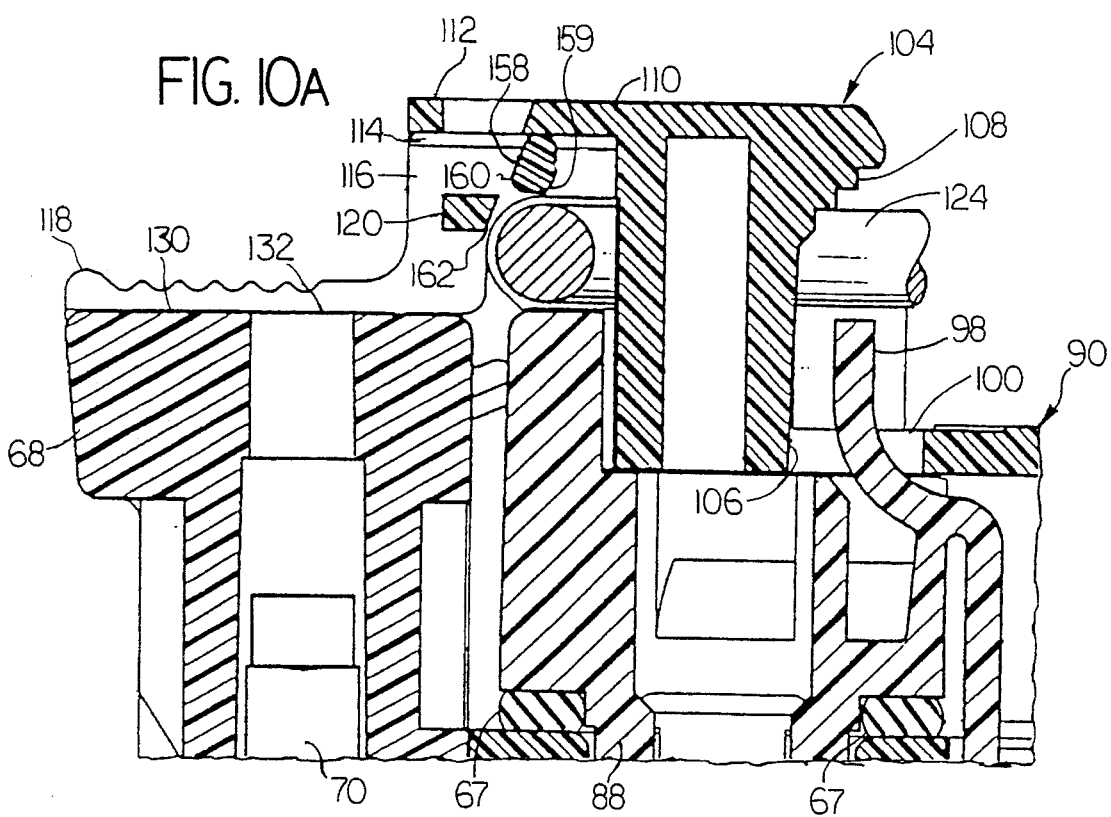
FIG. 10A is an enlarged sectional view of a portion of the network termination module of the invention illustrating the security cover in its fully closed condition.
Figure 10B:
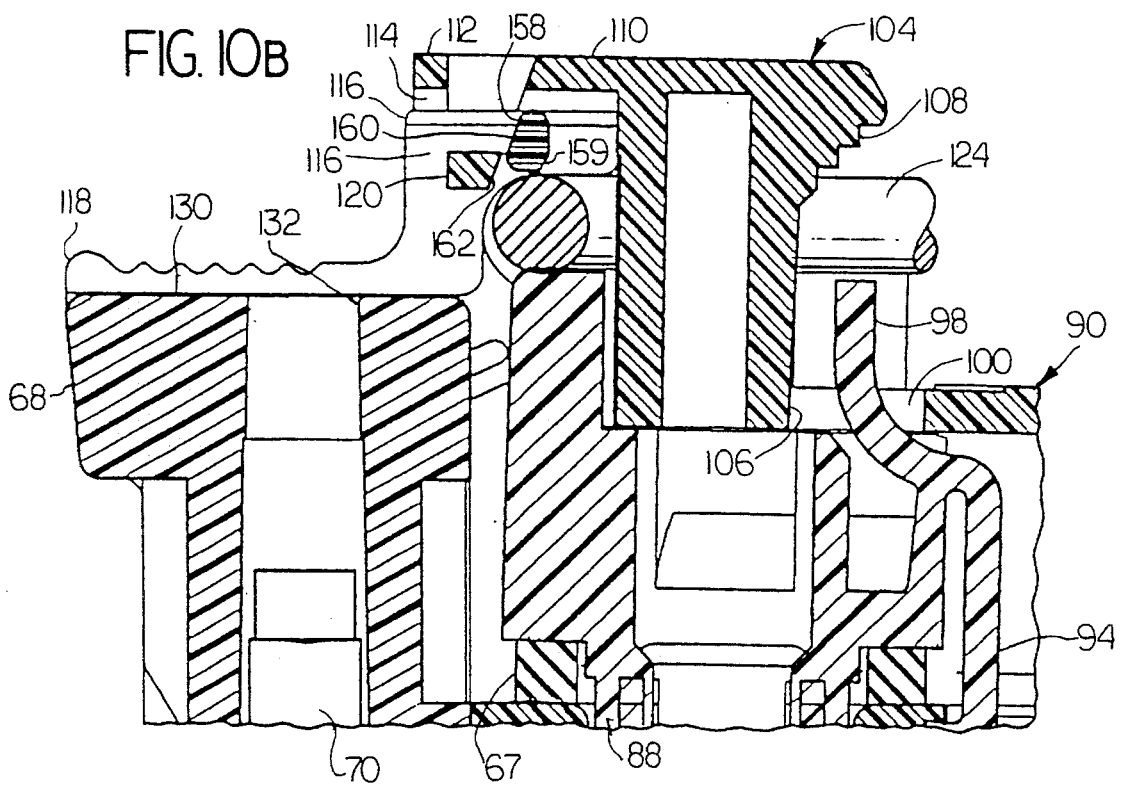
FIG. 10B is a view similar to FIG. 10A illustrating the security cover in its closed "at rest" condition.
Figure 12:
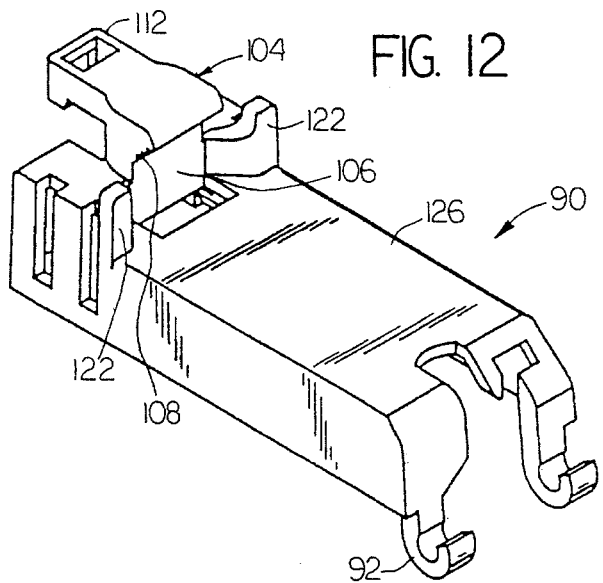
FIG. 12 is a top perspective view of the security cover according to the invention shown detached from the network termination module.

The locking finger 116 is located at the leading end of the locking member 118 and is formed as an upwardly offset extension of the locking member body. As best shown in FIGS. 10a and 10b, the extent of offset of the locking finger 116 is such as to define a space between it and the adjacent portion of the security cover 90 to enable the arm to extend across the padlock bail 124, thus to define the base structure element with which the bail cooperates to produce its locking function to prevent opening the security cover. It will be appreciated that, when the locking member is moved to its retracted limit, defined by abutment of the end surface 154 on finger 150 with shoulder 138 on the slot surface, the locking finger 116 no longer extends across the padlock bail 124. Thus, the padlock 102 is incapable of performing its locking function between the cover 90 and a base structure element and the cover can thereby be pivoted to an open position regardless of the padlock being secured and locked in place about the padlock retainer member 104 on the cover. In order to facilitate unencumbered movement of the cover 90 past the locking finger 116 on the retracted locking member 118, the face of the free end of the cover is desirably formed with a vertical slot 156.

As will be appreciated, the benefits of the present invention are realized when network terminal modules 12 incorporating the invention are operatively positioned in the network interface apparatus 10 and attached to the panel 16' of the enclosure housing 14. With a single module 12 mounted to the panel 16' or, more commonly, a plurality of modules similarly mounted in stacked side-by-side array and with the locking member 118 moved to its extended position in which the locking finger 116 extends across the padlock bail 124, the telco cover 42 is pivoted to its closed condition and secured therein by threadedly connecting the cap 46 to the post 48. With the telco cover 42 so-disposed, the endpieces 112 of the padlock retainer members 104 are received in recesses 159 that may be formed at longitudinally spaced locations along the free edge of the cover so that it not only encloses and prevents access to the telco portion 34 of the housing, including the line terminals 70 in the shroud 68 but also overlies and thereby prevents access to the locking member 118 so that the locking member cannot be moved to its retracted position. Consequently, when the main closure cover 28 of the housing 14 is opened by a subscriber, or the like, access to the subscriber terminals 78 in a concerned module 12 can be achieved only by the unlocking and removal of the padlock 102 from the retainer member 104. On the other hand, should access to the subscriber terminals 78, or to any other elements enclosed by the security cover 90, be desired by a telco installer, or the like, such access can be readily obtained by the opening of the telco cover 42 through use of the authorized driver for the threaded cap 46, followed by movement of the now-accessible locking member 118 to its retracted position. With the locking member 118 retracted, the locking finger 116 is removed from its overlying disposition with respect to the padlock bail 124 and the cover 90 can be pivoted to its open position upon depression of the actuator 98 to release the connection between the snap latch 94 and the lip 96 on the base structure 52.

A particular benefit is derived from the construction by virtue of the space, indicated as A in FIG. 7, between the downwardly projected portion of the endpiece 112 and the facing surface of the cover 90 being less than the diameter of the bail 124, whereby the padlock 102 will be retained on the cover when the cover is moved to its open position by an authorized telephone company installer following opening of the telco cover 42. Due to flexibility existent in the lock retainer arm 110, the padlock 102 can be readily removed from its attached condition on the cover 90 by simply forcibly pulling the lock in a direction to cause the bail 124 to elastically displace the retainer arm 110 enabling removal of the padlock from the cover, as, for example, if a subscriber moves from the premises without removing the padlock.

The described organization also provides, as an added security feature, a device for supplementing the locking capability of the snap latch 94 in engagement with the lip 96 on base structure 52 in order to prevent unauthorized opening of the cover 90 by applying sufficient upward force to displace the latch with respect to the lip and fracture of the locking finger 116. Thus, the locking finger 116 is provided with a pair of oppositely extending projections 158 which increase the amount of surface area on the locking finger and thereby strengthen the interface between the locking finger as deflected upwardly by bail 124 and the adjacent surface 113 of the endpiece 112 of lock retainer arm 110. More importantly, however, the inturned flanges 120 on the endpiece 112 are particularly located to coact with the projections 158 on the locking finger 116 in order to enhance the locking capability of the apparatus by coupling tensile forces therebetween.

Reference is made to FIGS. 10A and 10B of the drawing, of which the former illustrates the relationship of the respective elements of the apparatus when a downwardly directed closing force is imposed upon the cover 90, thereby compressing the elastomeric gasket 67. FIG. 10b, on the other hand, illustrates the apparatus elements when the closing force has been removed from the cover and the gasket 67 therefore expanded to place the cover in an "at rest" position with the flanges 120 positioned in substantial rearward alignment with the projections 158 to obstruct the projections and thereby inhibit retrograde movement of the locking member 118.

Advantageously, the projections 158 may each be formed on their leading face with an inclined surface indicated as 159 capable of engaging the forward face of the flange 120 in order to depress the cover against the force of the gasket 67 as the locking member 118 is moved to extend the finger 116 across the bail 124. The cooperative effect produced by the substantial parallelism between the rear faces 160 of the projections 158 and the forward faces 162 of the flanges 120 prevents the locking member 118 from being accidentally retracted, as for example, due to exposure to vibrations, or the like. This cooperative effect also serves to prevent forcible opening of the security cover 90 which might otherwise occur if finger 116 were overstressed and deformed. The coupling between rear faces 160 of projections 158 and the forward faces 162 of flanges 120 prevents retraction of the locking finger 116 from endpiece 112, even when the locking finger is severely overstressed by an effort to open cover 90 while the padlock is in place.

FIG. 17 illustrates an alternative embodiment of the present invention. In this embodiment, the locking member, indicated by numeral 118', is mounted for rotational movement on the upper surface 130 of the shroud 68. The mounting is effected by a fixed pivot pin 164 that penetrates the shroud surface between the line terminal openings 132. The locking member 118' is formed at its forward end with an offset locking finger 116' adapted to overlie the bail of a padlock (not shown) that is attached to the cover 90 about the padlock retainer member 104' as hereinbefore described. At its rear end the member 118' may be provided with an upturned flange or tab 166 to facilitate grasping the member in order to rotate it.

The operation and effect of this embodiment of the invention is substantially the same as that of the previously described embodiment, except that linear movement of the locking member 118 is replaced by rotational movement of the locking member 118'. Thus, with the locking finger 116' extending across the bail 124 of a padlock in the same manner as the earlier locking finger 116, and the module, indicated here as 12', installed in the same manner in the housing 14, the telco cover 42 in its closed position will cover all of the locking member 118' except for the locking finger 116'. Consequently, since the padlock is restrained in place by the locking finger 116° and since access to the locking member 118' is prevented by the telco cover 42, only by unlocking the padlock and removing it can the cover 90 be opened. On the other hand, the opening of the telco cover 42 by the authorized manipulation of its threaded cap 46 exposes the locking member 118' which can be rotated on pivot pin 164 to displace the locking finger 116' thereby freeing the cover 90 for pivotal movement to its open position.

It will be understood that various changes in the details, materials and arrangements of parts which have been herein described and illustrated in order to explain the nature of the invention, may be made by those skilled in the art within the principle and scope of the invention as expressed in the appended claims.

We claim:

1. A network termination module for attachment to a telephone network interface apparatus, comprising:

a base structure;

means in said base structure for connecting telco wiring thereto;

means in said base structure for connecting subscriber wiring thereto;

a movable cover adapted to enclose said subscriber wiring connecting means;

means for attaching a padlock to said cover for securing said cover to said base structure;

a locking member mounted on said base structure for movement between a first position and a second position, and a locking finger on said locking member operative, when said locking member is in said first position, to obstruct said locking member and said padlock and, when said locking member is in said second position, to free said locking member from said padlock.

2. A network termination module according to claim 1 including a slide guideway formed in said base structure, and in which said locking member comprises a body slidable in said guideway between said first position and said second position, said locking member being formed with said locking finger thereon to overlie said padlock when said locking member body is slidingly moved to said first position and to be retracted from said padlock when said locking member is slidingly moved to said second position.

3. A network termination module according to claim 2 in which said guideway includes a portion formed as a T-slot and said locking member body includes a portion having a sectional shape to conform to that of said slot for preventing relative vertical movement between said body and said guideway.

4. A network termination module according to claim 3 including spring means for biasing said locking member body into snug engagement with said slot.

5. A network termination module according to claim 4 in which said spring means are integrally formed on said locking member body.

6. A network termination module according to claim 5 in which said spring means comprises a flexible finger depending from said locking member body, said flexible finger being operative to engage the adjacent surface of said guideway for imparting an upward bias to said body.

7. A network termination module according to claim 2 including abutment means cooperatively formed on said body and said guideway operative to limit the extent of movement of said body along said guideway between said first and second positions.

8. A network termination module according to claim 7 in which said abutment means comprises oppositely-acting cooperating pairs of shoulders on said body and in said guideway, respectively, for limiting the extent of movement of said body in opposite directions in said guideway.

9. A network termination module according to claim 8 in which said guideway contains a sliding surface having oppositely facing shoulders at longitudinally spaced locations therealong and said locking member body contains shoulders for cooperation with said guideway shoulders and longitudinally spaced a distance greater than the spacing between said guideway shoulders whereby said locking member is movable longitudinally along said guideway between said first and second positions.

10. A network termination module according to claim 9 in which said locking member body contains a first depending projection having a face forming a shoulder cooperative with a first shoulder located at the end of said guideway to define said lock member first position.

11. A network termination module according to claim 10 in which said locking member body contains a second depending projection longitudinally spaced from said first depending projection and having a face oppositely directed therefrom forming a shoulder cooperative with a second shoulder in said guideway longitudinally spaced from said first shoulder therein to define said lock member second position.

12. A network termination module according to claim 11 in which said guideway includes a portion formed as a T-slot and said lock member body includes a portion having a sectional shape to conform to that of said slot for preventing relative vertical movement between said body and said guideway, said second depending projection on said body comprising a flexible finger operative to engage the adjacent surface of said guideway for imparting an upward bias to said body within said slot.

13. A network termination module according to claim 1 in which said telephone network interface apparatus includes a pivotably mounted telco cover that, when closed, is operative to isolate telco wiring in said apparatus from subscriber wiring therein, said telco cover, when closed, extending across said locking member to prevent unauthorized access thereto.

14. A network termination module for attachment to a telephone network interface apparatus, comprising:

a base structure including a plurality of upstanding sides and a top defining a substantially hollow body;

a shroud containing means for connecting telco wiring disposed adjacent one end of said top;

subscriber terminals disposed on said top intermediate said shroud and the top other end;

a movable cover of a size to overlie said subscriber terminals pivotally connected to said top other end;

means for attaching a padlock to said cover for securing said cover to said base structure;

a locking member mounted on said shroud for movement between a first position and a second position; and a locking finger on said locking member operative when said locking member is in said first position to be received in said cover to obstruct said locking member and said padlock and, when said locking member is in said second position, to free said locking member from said padlock.

15. A network termination module according to claim 14 including a slide guideway formed in said shroud, and in which said locking member comprises a body slidable in said guideway between said first position and said second position, said locking member being formed with said locking finger thereon for overlying said padlock when said locking member body is slidingly moved to said first position and said locking finger is received in said cover and to be retracted from said padlock when said locking member is slidingly moved to said second position and said locking finger is retracted from said cover.

16. A network termination module according to claim 15 in which said guideway includes a portion formed as a T-slot and said locking member body includes a portion having a sectional shape to conform to that of said slot for preventing relative vertical movement between said body and said guideway.

17. A network termination module according to claim 16 including spring means for biasing said locking member body into snug engagement with said slot.

18. A network termination module according to claim 17 in which said spring means are integrally formed on said locking member body.

19. A network termination module according to claim 18 in which said spring means comprises a flexible finger depending from said locking member body, said finger being operative to engage the adjacent surface of said guideway for imparting an upward bias thereto.

20. A network termination module according to claim 15 including abutment means cooperatively formed on said locking member body and said guideway operative to limit the extent of movement of said body along said guideway between said first and second positions.

21. A network termination module according to claim 20 in which said abutment means comprises oppositely-acting cooperating pairs of shoulders on said locking member body and in said guideway, respectively, for limiting the extent of movement of said body in opposite directions in said guideway.

22. A network termination module according to claim 21 in which said guideway contains a sliding surface having oppositely facing shoulders at longitudinally spaced locations therealong and said locking member body contains shoulders for cooperation with said guideway shoulders and longitudinally spaced a distance greater than the spacing between said guideway shoulders whereby said locking member is movable longitudinally along said guideway between said first and second positions for selectively inserting said locking finger into said cover and retracting it therefrom.

23. A network termination module according to claim 22 in which said locking member body contains a first depending projection having a face forming a shoulder cooperative with a first shoulder in said guideway to define said first position of said lock member placing said locking finger in received relation in said cover.

24. A network termination module according to claim 23 in which said locking member body contains a second depending projection longitudinally spaced from said first depending projection and having a face oppositely directed therefrom forming a shoulder cooperative with a second shoulder in said guideway longitudinally spaced from said first shoulder therein to define said second lock member position disposing said locking finger retracted from said cover.

25. A network termination module according to claim 24 in which said guideway includes a portion formed as a T-slot and said lock member body includes a portion having a sectional shape to conform to that of said T-slot for preventing relative vertical movement between said body and said guideway, said second depending projection on said body comprising a flexible finger operative to engage the adjacent surface of said guideway for imparting an upward bias to said body within said slot.

26. A network termination module according to claim 15 including means on said cover forming a receiver for said locking finger when said locking member is disposed in said first position, said receiver means including an endpiece having a top wall overlying said locking finger to limit displacement of said locking finger, whereby movement of said cover in an opening direction is obstructed.

27. A network termination module according to claim 26 in which said locking finger contains transversely extending projections for enlarging the bearing surface between said locking member and said receiver means top wall.

28. A network termination module according to claim 27 in which said receiver means includes inturned flanges disposed in subjacent, spaced relation from said top wall, said flanges being positioned to engage said locking finger projections for obstructing movement of said cover in an opening direction when said padlock is installed.

29. A telephone network termination module according to claim 15 in which said shroud contains spaced openings extending perpendicularly with respect to said guideway on opposite sides thereof; and line terminals disposed in said openings for connecting telco wiring to said base structure.

30. A network termination module according to claim 14 in which said telephone network interface apparatus includes a telco cover operative, when closed, to overlie the locking member of said network termination module attached to said apparatus to prevent access to said locking member; and means for pivotally mounting said telco cover with respect to said apparatus for opening said cover and exposing said locking member.

31. A network termination module according to claim 30 in which said telco cover, when closed, overlies said locking member and said line terminal openings in said shroud.

32. A network termination module according to claim 1 including a pivot pin securing said locking member to said base structure for pivotal movement of said locking member between said first position and said second position.

33. A network termination module according to claim 14 including a pivot pin securing said locking member to said shroud for pivotal movement of said locking member between said first position and said second position.

34. A network termination module according to claim 33 in which said pivot pin is secured to the upper surface of said shroud to define a pivot axis perpendicular thereto, and said locking member receives said pivot pin intermediate its ends to permit pivotal movement thereabout.

35. A network termination module according to claim 34 in which said locking member is formed with a locking finger at one end and an operating tab at the other end thereof.

36. A network termination module according to claim 15 including a padlock retainer member disposed on said security cover for reception of the bail of said padlock, said retainer member including a lock retainer arm extending over said padlock bail and having a substantially hollow endpiece positioned to receive said locking finger when said locking member is in said first position.

37. A network termination module according to claim 36 including a pair of oppositely extending projections on said locking finger; and flange means located on said retainer member endpiece to engage said projections during pivoted movement of said cover with said locking member in said first position and said padlock is installed.

38. A network termination module according to claim 37 in which said flange means comprises a pair of flanges extending oppositely inwardly from a lower portion of said endpiece to a position below and slightly rearward of said locking finger projections with said locking member in said first position.

* * * * *

UNITED STATES PATENT AND TRADEMARK OFFICE
CERTIFICATE OF CORRECTION

PATENT NO. : 5,497,416

DATED : Mar. 5, 1996

INVENTOR(S) : Walter K. Butler, III, et al

It is certified that error appears in the above-indentified patent and that said Letters Patent is hereby corrected as shown below:

On title page, item [73], "Siecor Corporation" should read --Siecor Puerto Rico, Inc.--

Signed and Sealed this

Eleventh Day of June, 1996

Attest:

BRUCE LEHMAN

*Attesting Officer*  *Commissioner of Patents and Trademarks*